Figure 1:
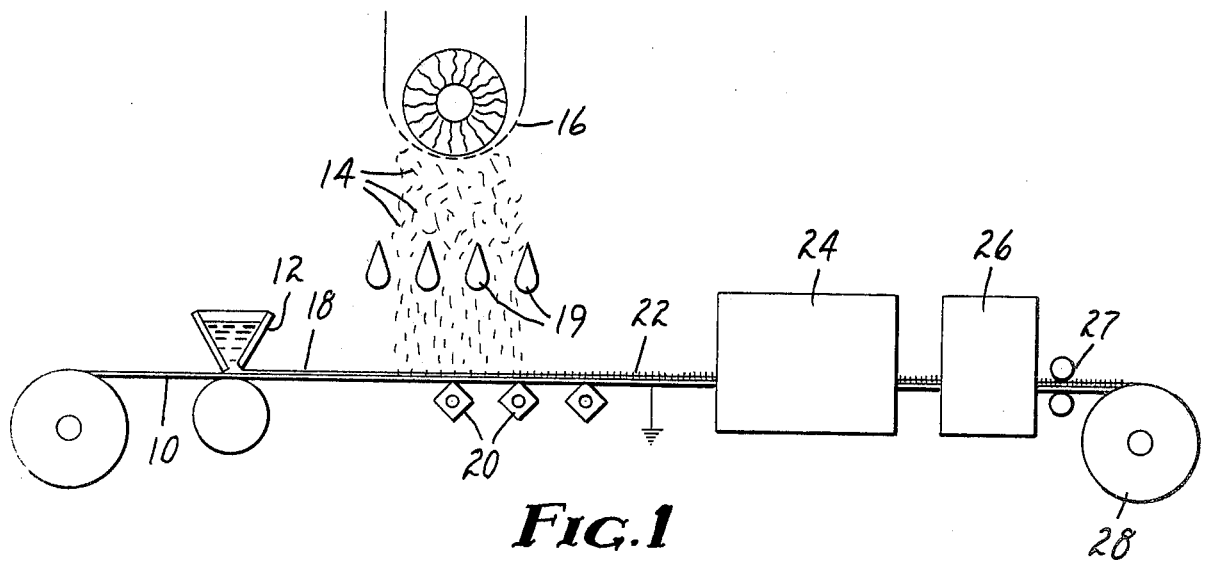

United States Patent [19]

Miklos et al.

[11] 4,417,291
[45] Nov. 22, 1983

[54] RECORDING DISKETTE HAVING FLOCKED-FIBER WIPING FABRIC

[75] Inventors: Richard L. Miklos; Craig F. Lamphere, both of St. Paul, Minn.

[73] Assignee: Minnesota Mining and Manufacturing Company, St. Paul, Minn.

[21] Appl. No.: 302,293

[22] Filed: Sep. 14, 1981

Related U.S. Application Data

[63] Continuation-in-part of Ser. No. 106,753, Dec. 26, 1979, abandoned.

[51] Int. Cl.³ .................. G11B 23/02; G11B 25/04
[52] U.S. Cl. ............................ 360/133; 206/444; 360/99
[58] Field of Search ............. 360/133, 135, 97–99; 206/312–313, 444; 427/200, 206

[56] References Cited

U.S. PATENT DOCUMENTS

| | | | |
|---|---|---|---|
| 3,224,753 | 12/1965 | Way | 206/313 |
| 3,422,952 | 1/1969 | George | 206/313 |
| 3,668,658 | 6/1972 | Flores et al. | 360/133 |
| 3,765,922 | 10/1973 | Chisholm | 427/200 |
| 3,864,755 | 2/1975 | Hargis | 360/133 |
| 3,917,883 | 11/1975 | Jepson | 427/206 |
| 3,922,410 | 11/1975 | Halloran | 427/200 |
| 4,034,134 | 7/1977 | Gregorian et al. | 427/200 |
| 4,038,693 | 7/1977 | Huffine et al. | 360/99 |
| 4,076,874 | 2/1978 | Giovanelli et al. | 206/313 |
| 4,100,311 | 7/1978 | Nablo et al. | 427/206 |
| 4,251,843 | 2/1981 | Masuyama et al. | 360/133 |
| 4,263,634 | 4/1981 | Chenoweth et al. | 360/133 |

FOREIGN PATENT DOCUMENTS

1057396 6/1979 Canada.
1410020 10/1975 United Kingdom ............... 206/313

OTHER PUBLICATIONS

IBM TDB, M. E. Bothun, Encased Magnetic Disk With Wiper, vol. 19, No. 12, May 1977, pp. 4720–4721.

*Primary Examiner*—Alfred H. Eddleman
*Attorney, Agent, or Firm*—Donald M. Sell; James A. Smith; Douglas B. Little

[57] ABSTRACT

Magnetic recording diskette has as the wiping fabric a flocked-fiber layer. While prior diskettes have required individual pieces of wiping fabric to be adhered to individual sheets of jacket material, the flocked-fiber layer can be applied to a roll of the jacket material continuously to provide roll stock from which individual jacket blanks can be die-cut.

10 Claims, 3 Drawing Figures

RECORDING DISKETTE HAVING FLOCKED-FIBER WIPING FABRIC

CROSS-REFERENCE TO RELATED APPLICATION

This application is a continuation-in-part of copending application Ser. No. 106,753, filed Dec. 26, 1979, now abandoned.

TECHNICAL FIELD

This invention concerns recording media such as a diskette which comprises a flexible magnetic recording disk contained in a jacket to which is attached a wiping fabric in facing relationship to the disk. A typical diskette is disclosed in U.S. Pat. No. 3,668,658 (Flores et al.).

BACKGROUND ART

The wiping fabric of U.S. Pat. No. 3,668,658 comprises a porous, low-friction, anti-static material which may be a self-supporting dusting fabric.

U.S. Pat. No. 4,239,828 (Knope et al.) suggests that the wiping fabric may be a tissue-like material of synthetic fibers such as rayon and polypropylene fibers which have been fused together to afford integrity to the fabric. This is attached to a sheet of the jacket material by a single pass of a roll having knurled sections of about 3 mm in width which have been preheated to 175° C. This fuses the fabric to the jacket sheet only at the knurl patterns without observable change in the overall porosity of the fabric. A lubricant pre-applied to the fabric is continuouly wiped onto the disk in use.

In most diskettes now on the market, the tissue-like wiping fabric is fused to a sheet of the jacket material in point-contact patterns as in U.S. Pat. No. 4,263,634 (Chenoweth et al.). Ultrasonic welding is sometimes employed instead of heat. Whether laminated by heat or by ultrasonic welding, there have been problems such as (1) delamination of self-supporting fabrics from the diskette jackets, (2) the fabric scratching the surface of the recording disk, especially by hard nodules created upon fusing the wiping fabric to the jacket sheet, and (3) the tendency of fibers to protrude from the wiping fabric into the jacket openings, thus creating the hazard that the protruding fibers might be picked up by the drive mechanism and become trapped at the gap of the recording heads. There has also been a problem of torque variations, especially when the fiber distribution in the fabric has been nonuniform.

It is believed that all commercial diskettes are fabricated by cutting the tissue-like wiping fabric to size and adhering the cut pieces one at a time to individual sheets of the jacket material, leaving edges of each jacket sheet uncovered. Each sheet is then die-cut to provide a jacket blank; two edges which are not covered by the wiping fabric are folded and heat-sealed or otherwise adhered to the outer surface of the jacket blank to provide an envelope; the recording disk is inserted; and a third uncovered edge is folded and then adhered to the outer surface to enclose the disk. There have been problems with adhesion of the folded edges to the underlying jacket material.

Most newly-designed diskette drives record data on both faces of the magnetic recording disk. In those drives, the recording head at Side 0 of the diskette is fixed and the opposing head at Side 1 is spring-loaded. Adjacent the heads is a jacket load pad which lightly presses the two layers of wiping fabric against the recording disk to wipe off any dust and debris. The fixed recording head is adjusted with respect to the fixed member of the jacket load pad so as to penetrate into the recording disk sufficiently to insure uniform signal response, even when the jacket wall (i.e., jacket material plus wiping fabric) at Side 0 has its maximum thickness. When the jacket wall will has its minimum thickness, the recording head penetrates further into the recording disk, and while this still provides uniform signal response, it can produce undue wear both on the disk and on the head. Because of this, manufacturers of diskette drives would like to establish close tolerances for jacket wall thickness.

It is believed that of all diskettes now on the market, the thickness of the jacket material varies at least 2 mils (0.05 mm) and of the tissue-like wiping fabric varies at least 3 mils (0.075 mm). Hence, the best current thickness tolerance of the jacket walls is 5 mils ($\pm 2.5$ mils). Some have thickness variations up to 8 mils. A closer tolerance would permit the recording head to be adjusted to a lesser degree of penetration into the recording disk, thus reducing wear.

DISCLOSURE OF INVENTION

The present invention, which can eliminate the above-enumerated problems (1), (2) and (3), enables much closer tolerances for jacket wall thickness and also appears to provide more effective cleaning of the recording disk than do diskettes of the prior art. These advantages are accomplished by substituting for the wiping fabric of prior diskettes a layer of short, closely-spaced fibers. One end of each fiber is bonded directly to the inside surface of the jacket. The layer of fibers is economically produced by known flocking techniques and is generally here referred to as the flocked-fiber layer. The flocked-fiber layer does not produce noticeable scratching, does not cause any torque variations, and has been found to resist delamination from the jacket material.

The flocked-fiber layer can be applied to a roll of the jacket material continuously to provide roll stock from which individual jacket blanks can later be die-cut. This should permit an economical advantage compared to the individual-jacket-sheet assembly procedures of the prior art.

The flocked-fiber layer of the diskette of the present invention comprises fibers which preferably are predominantly 1 to 6 denier and 0.05 to 0.8 mm in length. One end of each fiber is bonded directly to the jacket, either by an adhesive or by solvent-bonding. In order to meet present diskette specifications, the flocked-fiber layer, including any adhesive added to bond it to the jacket, may increase the thickness of the jacket material about 0.15–0.3 mm to provide an overall thickness of the jacket material with its flocked-fiber layer of 0.35–0.45 mm. It may be necessary to calender the flocked-fiber layer in order to reduce it to a desired thickness, thereby bending over free ends of the fibers.

Although the diskette of the present invention is not yet on the market, a number of production-scale runs have been made substantially as described in Example 1 below in preparation for commercialization. These runs have demonstrated that each jacket wall can be maintained within one mil (0.025 mm) of a desired target thickness. In full production the thicknesses of the jacket walls should not vary more than 3 mils ($\pm 1.5$ mils). Hence, manufacturers of diskette drives should be able to adjust head penetration to vary no more than 2 or 3 mils, thus greatly reducing wear on both the recording disks and heads, as compared to tolerances no closer than 5 mils (±2.5 mils) in diskettes now on the market.

Preferably the fibers of the flocked-fiber layer are densely packed to about 0.5 to 3 ounces per square yard (17–102 g/m$^2$). If the fibers were too fine or too low in density, the recording surface might not be kept sufficiently clean, and the bonding agent might be exposed to scratch the recording surface. If the fibers were too coarse or too high in density, there might be undesirable variability in the torque required to rotate the disk.

Especially useful fibers for the flocked-fiber layer are rayon, nylon, polyester, acrylic, cotton and mixtures thereof.

The flocked-fiber layer may be created by conventional techniques. For example, a bonding agent may be applied to the jacket material to provide an adhesive layer which is viscous and tacky. Short, closely-spaced fibers are then embedded into the adhesive layer, each fiber being then bonded directly to the jacket material. The fibers may be attracted to the adhesive layer electrostatically or merely by gravity. It is preferred that there be a beater-bar beneath the jacket material to assist in driving the fibers into the viscous, tacky adhesive layer.

The bonding agent preferably is a water-based adhesive. A hot-melt adhesive may be used. The use of a solvent might be hazardous if the fibers are to be attracted to the adhesive layer electrostatically. However, the use of a solvent to activate the jacket material to an adhesive state provides certain known economies. If the jacket material comprises paper or otherwise has a fibrous nature, an adhesive coating can serve the dual functions of integrating those fibers and adhering the flocked-fiber layer.

To guard aginst fibers coming loose from the flocked-fiber layer during use of the diskette, the layer should be aggressively brushed and vacuumed while the adhesive is still tacky and also after it has set. The underside of the jacket material may be simultaneously agitated by a beater-bar to dislodge any unbonded or weakly bonded fibers to be carried off by the vacuum.

Preferably the fibers of the flocked-fiber layer are treated with an anti-static agent prior to flocking in order to provide a more uniform flocked-fiber layer, as is well known in the flocking art. That anti-static agent also enhances the bleeding off of charges from the magnetic recording disk of the diskette. Even so, it may be desirable to apply an additional anti-static coating to the fiber-flocked layer, preferably as an in-line process. Also as an in-line process and, if desired, simultaneously with application of an anti-static coating, a lubricant may be applied to the flocked-fiber layer as in the aforementioned U.S. Pat. No. 4,239,828.

For economy of manufacture, the flocked-fiber layer may be applied to completely cover one face of the jacket material, the width of which may be a multiple of the width of an individual jacket. The fiber-flocked jacket material may then be wound up for convenient storage and shipment. The flocked jacket material may later be unwound and die-cut to provide individual jacket blanks, each of which is folded and adhesively bonded to itself to enclose a magnetic recording disk. If desired, adhesive material may be applied only to selected areas of the jacket material, as by a gravure printing process, thus effecting a small raw material savings in both the adhesive material and the fibers. The need to maintain registration in the die-cutting step would offset at least partially that cost saving.

The diskette of the invention makes it more practical to use certain jacket materials that previously were believed to require uneconomical procedures, e.g., paper, polycarbonate film, and biaxially-oriented polyester film. When using paper, the adhesive base for the flocked-fiber layer can serve the additional function of stabilizing the paper, a function which previously would have required a separate operation. Polycarbonate and polyester films have not been economically adaptable to prior techniques for applying wiping fabric.

THE DRAWING

Figure 2:
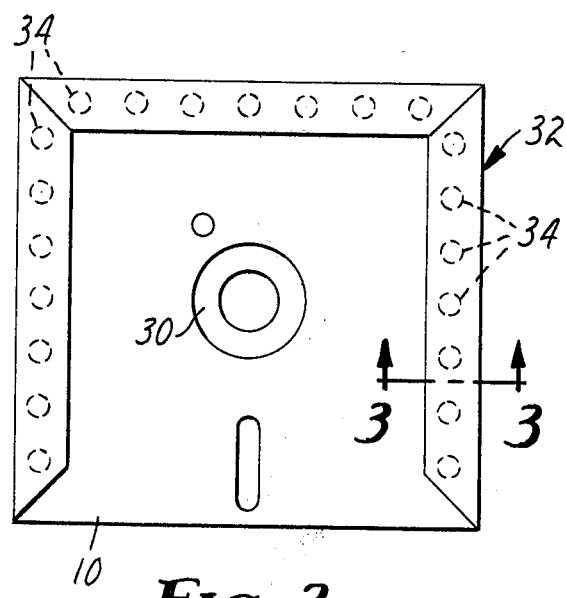

FIG. 1 schematiclally illustrates the application of flocked-fiber layer to jacket material;

FIG. 2 schematically shows a diskette of the invention; and

Figure 3:
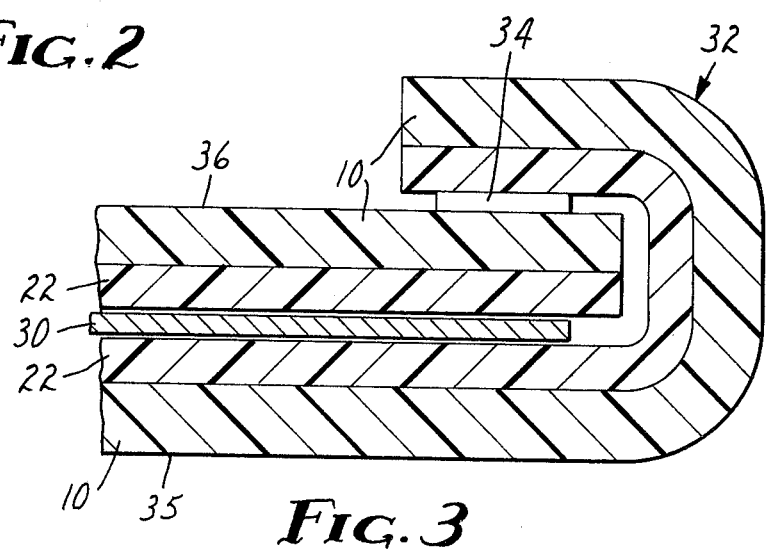

FIG. 3 is an enlarged cross-section along lines 3—3 of FIG. 2.

Referring to FIG. 1, jacket material 10 is unwound from a roll and coated with an adhesive composition at a hopper-fed-knife-coater 12. Fibers 14 falling from a brush hopper 16 are electrostatically attracted to the adhesive layer 18 with the aid of electrodes 19. A beater-bar mechanism 20 beneath the jacket material 10 assists in driving the fibers into the adhesive layer 18 to provide a flocked-fiber layer 22. An oven 24 drives off the water from the adhesive to bond the fibers to the jacket material. A cleaning station 26 removes loose fibers from both surfaces of the finished material which is then brought to the correct thickness in calender 27 and wound up into a roll 28.

The finished material of the roll 28 is later unwound and die-cut to provide individual jacket blanks which are folded around a flexible magnetic recording disk 30 to provide a diskette 32 as seen in FIG. 2. A series of adhesive dots 34 bond the folded edges to the surface of the jacket.

Referring to FIG. 3, the jacket of the diskette 32 consists of the jacket material 10 and the flocked-fiber layer 22 (which includes the adhesive layer 18). The jacket material 10 at one side 35 of the diskette extends beyond and is folded around the other side 36 of the diskette and its overlapped fiber-flocked layer 22 is bonded by the adhesive 34 to the uncoated surface of the underlying jacket material 10. A better bond has been obtained than has been experienced in bonding folded edges in the prior art.

EXAMPLE 1

Opaque plasticized polyvinyl chloride film of 11 mils (0.275 mm) thickness of the type used for flexible diskette jackets was knife-coated on one face with a waterborne acrylic-vinyl latex adhesive to a wet thickness of about 5 mils (0.125 mm) which by itself would dry to a thickness of about 3 mils (0.075 mm). Random-cut cotton flock (2–6 denier and 0.05–0.4 mm in length) was electrostatically attracted to the adhesive coating which was tacky and viscous, and the fibers were embedded into the adhesive with the aid of beater bars. After the flocked-fiber layer coat was dried in an air-circulating oven for 2 minutes at 50° C., both surfaces were aggressively brushed and vacuumed to remove loose fibers, and the finished material was wound up into a stock roll.

The stock roll was later slit to a useful width, further cleaned, and then calendered to reduce the overall thickness of the jacket material with its flocked-fiber layer to 18 mils (0.45 mm). Sheets cut from the roll were stacked and placed in an oven at about 52° C. for two hours to remove the roll-induced curl.

The sheets were die-cut to provide blanks which were folded and the two side flaps were sealed with a hot-melt adhesive. A magnetic recording disk was inserted, and the third flap was folded and sealed to provide finished diskettes about 8 inches (20 cm) square. The openings in the jackets appeared to be free from any fibers protruding from the flocked-fiber layer which could not be delaminated. In these respects the diskettes of the Example appeared to be superior to any diskette now on the market.

A number of diskettes of Example 1 were tested by rotating the recording disk in the horizontal position while the disk was pinched between the two sides of the jacket as in ANSI Specification No. X3B8/78-145. Diskette users generally specify ten million rotations without any visible effect upon the magnetic recording disk. Not a single diskette of this Example has failed this test even though many specimens have been tested for ten million rotations and some have been tested for 20 million rotations.

Initial tests suggest that the diskettes of this invention are at least equal in performance to all presently commercially available diskettes as to the torque required and the variability in the torque required to rotate the disk.

From a production-scale run of diskettes made substantially as described in Example 1, ten diskettes were selected at random. Another ten diskettes were selected at random from current commercial production of diskettes having a tissue-like wiping fabric. Measurements of jacket wall thickness of the diskettes revealed:

|  | Diskettes of Invention | Commercial Diskettes |
|---|---|---|
| Average thickness (mils) | 14.8 | 17.5 |
| Range of thickness (mils) | 1.0 | 5.8 |
| Standard deviation (mils) | 0.25 | 1.11 |

THE "PILLOW" TEST

The vinyl plastic used in presently commercial diskettes expands when heated, and this tends to produce a "pillow" shape which can cause the diskette to hang up in the diskette loading mechanism. ANSI Specification No. X3B8/78-145 includes a "pillow" test wherein a diskette is heated in an oven for a period of time, allowed to cool to room temperature, and then dropped under its own weight through a slot of a certain thickness. Subjected to this test were 20 specimens selected at random from current commercial production of prior-art diskettes and 40 diskettes of the invention made substantially as described in Example 1 and selected at random from production-scale runs. The wiping fabric of the prior-art diskettes was a tissue-like nonwoven web of polyester fibers. The vinyl plastic was the same in all 60 specimens. After 72 hours at 125° F., 19 of the 20 prior-art diskette specimens failed to drop through the slot, but none of the 40 diskette specimens of the invention failed.

While many manufacturers of diskette drives do not run the "pillow" test at conditions as severe as 72 hours at 125° F., at least one manufacturer does. To meet this, a higher-price plastic such as a modified vinyl plastic must be used. Hence, the present invention should provide a significant economy in its ability to pass the "pillow" test after 72 hours at 125° F. while using an economical vinyl plastic in the jacket.

The improved thermal stability achieved in the present invention is apparently due to the acrylic-vinyl latex adhesive used in making the novel diskettes of Example 1. The cotton flock might have had a reinforcing effect that would have helped to eliminate "pillowing". Had such an adhesive been applied in the manufacture of prior-type diskettes, that would have appreciably increased their cost and hence may not have been commercially practicable.

WEAR TEST

Used in this test was a roll of magnetic recording tape which has been manufactured to provide recording disks for diskettes, but had been shown to have poor wear resistance. Disks taken at random from the roll were used to make a number of prior-art diskettes as used in the "Pillow" test and a number of diskettes made substantially as described in Example 1. Using an ordinary diskette drive, each diskette was rotated in its jacket with a magnetic recording head riding on a prerecorded test track near the periphery of the disk. A dropout was indicated when the output level fell below 50% of the initial output for that disk. The following table reports the conditions for each test (the relative humidity being uncontrolled and unrecorded except as noted) and the number of passes at which a dropout was first recorded.

|  | No. of Passes $\times 10^6$ | |
|---|---|---|
| Conditions | Prior-art | Example 1 |
| −20° F. | 1.0 | 2.5 |
|  | 1.0 | 12 |
| 40° F. | 0.5 | 2.0 |
|  | 0.5 | 12* |
| 70° F. | 0.5 | 12* |
|  | 0.5 | 12* |
|  |  | 12* |
| 104° F. | 1.5 | 4.0 |
| 95% RH | 1.0 | 2.0 |
|  |  | 1.0 |
| 125° F. | 2.5 | 1.5 |
|  | 0.5 | 2.5 |
|  |  | 7.0 |

*Test discontinued without failure

Upon examination of the wiping fabrics after testing, brown-colored debris from the magnetic recording layer of each prior-art diskette had primarily concentrated adjacent the jacket load pad. The concentrated collected debris apparently had a wearing effect. In contrast, the debris was spread circumferentially adjacent the entire test track in the diskettes of Example 1 without any comparable concentration.

EXAMPLES 2–12

Various diskettes of the invention were made substantially as in Example 1 except for changes indicated in the following table.

| | Jacket | | Adhesive | | |
|Example|Material|Thickness (mm)|Material|Thickness Wet (mm)|Fibers|
|---|---|---|---|---|---|
| 2 | PET | 0.15 | A | 0.15 | nylon |
| 3 | PET | 0.15 | E | 0.1 | rayon I |
| 4 | PP | 0.25 | E | 0.1 | cotton |
| 5 | PP | 0.25 | E | 0.1 | rayon II |
| 6 | PC | 0.25 | B | 0.125 | rayon III |
| 7 | PVC | 0.275 | D | 0.1 | rayon I |
| 8 | PVC | 0.175 | C | 0.1 | cotton |
| 9 | PC | 0.25 | B | 0.125 | polyester |
| 10 | P-I | 0.175 | C | 0.125 | cotton |
| 11 | P-II | 0.25 | C | 0.1 | cotton |
| 12 | PET | 0.15 | A | 0.15 | cotton |

PET = opaque biaxially-oriented polyethylene terephthalate film
PP = opaque biaxially-oriented low-density polypropylene film
PC = opaque polycarbonate film
PVC = opaque plasticized polyvinyl chloride film
P-I = calendered manila paper made for tabulating card use
P-II = latex-coated paper
A = water-borne acrylic latex, 49% solids
B = water-borne acrylic latex, 45% solids
C = water-borne acrylic latex, 43% solids
D = water-borne vinyl-acrylic latex of Example 1
E = water-borne ethyl acrylate/polyvinyl acetate latex, 50% solids
nylon = random-cut nylon, 11-19 micrometers in thickness and 0.25-0.625 mm in length
rayon I = random-cut rayon, 9-17 micrometers in thickness and 0.25-0.625 mm in length
rayon II = precision-cut rayon, 12 micrometers in thickness and 0.25 mm in length
rayon III = precision-cut rayon, 12 micrometers in thickness and 0.375 mm in length
cotton = random-cut cotton of Example 1
polyester = precision-cut, cold-drawn polyethylene terephthalate, 17 micrometers in thickness and 0.5 mm in length Of the fibers used in the diskettes of Example 1-11, cotton provided the softest fabric and hence caused the least amount of wear of the facing magnetic recording layer. Rayon provided nearly equal softness. Of the fibers, the free ends of the cotton had the greatest tendency to lie in the plane of the surface of the fabric. As a consequence, frictional drag was desirably low. Of the fabrics of Examples 1-11, those made with cotton had the least directionality and hence provided the least variability in the torque required to drive the disk. The random-cut rayon was nearly as good as cotton in this respect. Of the fabrics, those made with rayon best dissipated static charges, with cotton a close second.

Of the jacket materials, polyvinyl chloride was the easiest to handle in folding and showed the least tendency for the fold to open upon exposure to elevated temperatures. However, polyvinyl chloride was the most susceptible to damage if exposed to unusually high temperatures which might carelessly be encountered. Biaxially-oriented polyethylene terephthalate film was considered to be the best jacket material because of its good resistance to high temperatures, its high strength and stiffness and excellent durability.

We claim:

1. Improved diskettes, each of which comprises a thin jacket containing a flexible recording disk and a wiping fabric bonded to the jacket in facing relationship to the disk, wherein the improvement comprises:
   (a) the wiping fabric being comprised of a layer of short, closely-spaced fibers, one end of each fiber being bonded directly to the jacket; and
   (b) diskette jacket walls which do not vary in thickness more than 3 mils.

2. Diskettes as defined in claim 1, wherein variations in jacket wall thickness are within 2 mils.

3. Diskettes as defined in claim 1, wherein said fibers predominantly are 1 to 6 denier and 0.05 to 0.8 mm in length.

4. Diskettes as defined in claim 1, wherein said fibers are present in the amount of 0.5 to 3 ounces per square yard.

5. Diskettes as defined in claim 1, wherein said fibers are selected from at least one of rayon, nylon, polyester, acrylic and cotton.

6. Diskettes as defined in claim 1, wherein said layer of fibers completely covers the inner face of the jacket.

7. Diskettes as defined in claim 1, wherein said layer of fibers covers only a portion of the inner face of the jacket.

8. An improved composite diskette jacket material comprising a sheet of jacket material bonded to a wiping fabric, wherein the improvement comprises:
   (a) a wiping fabric comprising a layer of short, closely-spaced, flocked fibers;
   (b) said fibers being predominantly 1 to 6 denier and 0.05 to 0.8 mm in length;
whereby the variation in thickness of the cmposite diskette jacket material is not more than plus or minus 1.5 mils.

9. The improved composite diskette jacket material of claim 8 wherein the density of the flocked fiber is 17 to 102 grams per square meter of jacket material.

10. A diskette jacket made from the diskette jacket material of claim 8.

* * * * *